United States Patent [19]

Kaufmann et al.

[11] Patent Number: 5,638,772

[45] Date of Patent: Jun. 17, 1997

[54] COMBINATION TOY AND CHILD SAFETY LINE

[76] Inventors: Mark Kaufmann, 7204 Panorama Dr., Derwood, Md. 20855; Kimberly R. Jacobs, Dusterberry Way, Fremont, Calif. 94536

[21] Appl. No.: 552,216

[22] Filed: Nov. 2, 1995

[51] Int. Cl.$^6$ .................................................. A01K 29/00
[52] U.S. Cl. .......................... 119/770; 119/907; 128/875; 446/71
[58] Field of Search .......................... 446/71, 72, 227, 446/28; 119/770, 857, 907, 792; 128/875, 878; 70/16, 18; 24/298–302; D29/11

[56] References Cited

U.S. PATENT DOCUMENTS

| | | | |
|---|---|---|---|
| D. 300,474 | 3/1989 | Caulder et al. | D29/11 |
| D. 300,475 | 3/1989 | Caulder et al. | D29/11 |
| D. 309,353 | 7/1990 | Joachim | D29/11 |
| 1,651,561 | 7/1927 | Storey . | |
| 1,711,864 | 2/1929 | Whidden . | |
| 2,212,746 | 9/1940 | Nunn | 227/49 |
| 2,677,488 | 5/1954 | Prusan | 227/49 |
| 2,994,300 | 7/1961 | Grahling | 119/96 |
| 3,088,438 | 5/1963 | Oliphant | 119/96 |
| 3,104,650 | 9/1963 | Grahling | 119/96 |
| 3,184,883 | 5/1965 | McCook | 446/28 |
| 4,445,866 | 5/1984 | Cillieres | 119/770 X |
| 4,563,159 | 1/1986 | Hills et al. | 446/74 |
| 4,595,618 | 6/1986 | Caringer | 446/28 X |
| 4,666,017 | 5/1987 | Zimmerman | 182/3 |
| 4,667,624 | 5/1987 | Smith | 119/96 |
| 4,688,564 | 8/1987 | Kelly | 128/133 |
| 4,765,279 | 8/1988 | Klickstein | 119/109 |
| 4,977,860 | 12/1990 | Harwell | 119/109 |
| 5,003,672 | 4/1991 | Randall | 24/300 |
| 5,069,168 | 12/1991 | Roberson et al. | 119/96 |
| 5,080,045 | 1/1992 | Reese et al. | 119/109 |
| 5,119,767 | 6/1992 | Jimenez et al. | 119/96 |
| 5,125,864 | 6/1992 | Roberson et al. | 446/268 |
| 5,161,486 | 11/1992 | Brown | 119/109 |
| 5,259,338 | 11/1993 | Cornell | 119/770 |
| 5,325,818 | 7/1994 | Leach | 119/770 |
| 5,326,300 | 7/1994 | Sonders | 446/74 |
| 5,356,355 | 10/1994 | Campbell | 482/43 |
| 5,379,725 | 1/1995 | Roberson et al. | 119/770 |
| 5,388,551 | 2/1995 | Martusciello | 119/770 |

OTHER PUBLICATIONS

P. 11 Tag Along #4523 Fanny Pack Security Strap (J) (Catalog).
P. 61 Hands–Free Tether #G358 (E) (Little–One Catalog).
P. 61 Tot–Safe #G127 (H) (Little–One Catalog).

*Primary Examiner*—Mickey Yu

[57] ABSTRACT

A combination toy and child safety line which restricts the range of motion of a child while providing storage capability, entertainment and social acceptability. A flexible tether is connected to a belt by a ring which is hidden from view by a decorative toy. The decorative toy is hollow and has an opening for storage of small objects. The tether retracts smoothly into the casing of a retractable mechanism which is also hidden from view by a decorative toy. The casing of the retractable mechanism is connected by a bracket onto a second belt. The first belt is attached around the waist of a child, and the second belt is attached around the waist of a caretaker.

6 Claims, 4 Drawing Sheets

COMBINATION TOY AND CHILD SAFETY LINE

BACKGROUND—FIELD OF INVENTION

The present invention relates both to toys and to tether and leash devices used for securing a young child or children to a caretaker, and more specifically to a visually appealing toy for entertaining children which also operates as a socially acceptable child safety line.

BACKGROUND—DESCRIPTION OF PRIOR ART

Many caretakers of children prefer to constrict the movements of their young children during certain activities, such as in airports, on sidewalks of busy streets, in shopping centers, and the like. When a child is between the ages of one and four, many caretakers prefer a leash or harness system to constrain the motion of their children in order to avoid dangerous situations and lost children. Leash and harness systems are also useful as deterrents of kidnapping.

Leash and harness systems taught by many others have a number of disadvantages. First, leash and harness systems are considered by many to be socially unacceptable. Some caretakers refuse to use such systems because of the social stigma placed on the use of what they consider "animal-like" leashes for the control of one's child. Very few if any harnesses or leashes in the public domain have attempted to soften these negative implications. A child safety line designed specifically to be socially acceptable would offer an important utility to caretakers who desire to control the range of motion of their children, but who hesitate to place their children on what they consider to be animal-like leashes.

Second, when a child grows old enough to understand the restrictive nature of the leash or harness system, he or she may decline its use. A tethering device that provides enjoyable features other than that of a child constraint, such as the features of a toy or a fanny pack to store small objects, would provide welcome utility both to the caretaker and the child.

Third, leashes and harnesses almost always constrain the hands or arms of the wearers. For example, U.S. Pat. Nos. 5,379,725, 5,325,818, and 5,069,168 among others, describe harness systems where the caretaker is required to hold a tether attached to the harness. Other child leash systems in the public domain include wrist-to-wrist leashes, for example, U.S. Pat. No. 4,688,564, which constrain the hand and arm movements of both the caretaker and the child. These leash and harness systems are often difficult to use particularly in situations when the caretaker most requires their use, such as when carrying groceries, or walking with a baby stroller. It would be desirable to offer a child safety line which does not constrain the hand or arm movements of the wearers.

Fourth, current child safety lines can be used readily for a single child, but cannot be used for multiple children without great difficulty because the caretaker is often required to hold all "leashes" simultaneously. A tether system which allows greater ease of use with multiple children would be of significant utility to caretakers with more than one child to look after.

Finally, leash and harness systems possess tethers which must be short enough to avoid tangling and therefore further restrict the range of freedom of the child and the caretaker. A tether which can be retracted as the child moves closer to the caretaker and expanded as the child moves away would allow a greater potential range of freedom without tangling the tether.

No single invention is known which consists of a toy which can also be used as a child safety line. In addition, no single invention is known which further consists of a child safety line designed specifically to be socially acceptable and to possess other practical features such as a fanny pack and a retractable mechanism to prevent tangling.

OBJECTS AND ADVANTAGES

Several objects of the present patent are the following:

a) to provide a socially acceptable child safety line b) to provide a child's toy which can both entertain a child and function as a child-safety line c) to provide an entertaining child's toy which can also be used to store small objects d) to provide a simple child safety line which does not require the use of hands or arms for successful operation e) to provide a child safety line which does not tangle and which provides greater freedom of motion than current tethers f) to provide a child safety line which permits multiple child safety lines to be employed in series for use with more than one child Further objects and advantages of the invention will become apparent from the consideration of the drawings and ensuing descriptions.

DRAWING FIGURES

DESCRIPTION OF INVENTION

Figure 1:
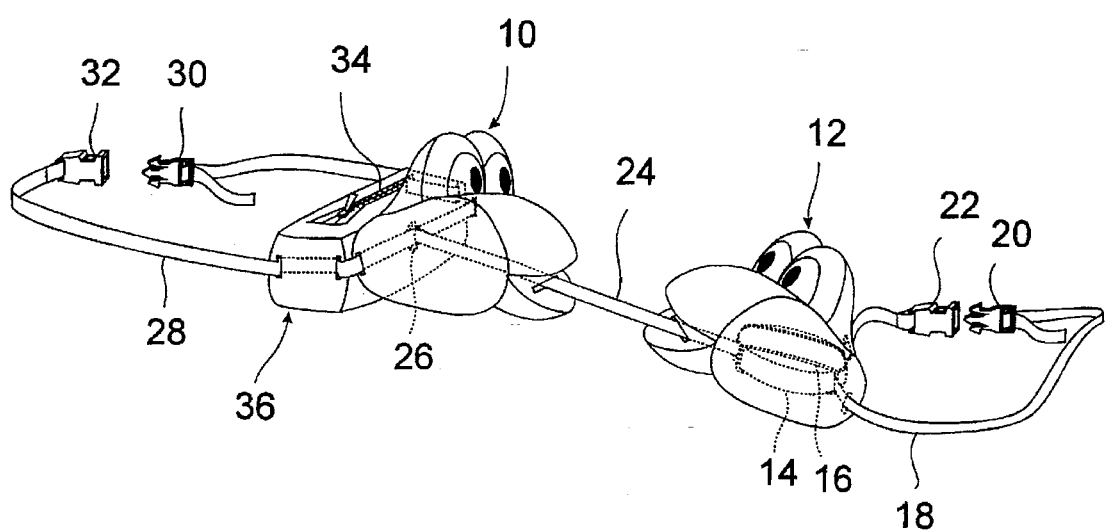
FIG. 1 shows a side perspective of the preferred embodiment of the combination toy and child safety line with a retractable tether mechanism, two belt attachments, one fanny pack, and frogs as the decorative toys.

The preferred embodiment of the combination toy and child safety line is shown in FIG. 1. A tether 24, preferably made of cloth or flexible material durable enough to withstand the weight of a small child, is connected to a belt 28 by tether attachment ring 26, and retracts smoothly into retractable mechanism 14. Retractable mechanism 14 is further attached to belt 18 by bracket 16. Belt 18 fastens to the caretaker's waist by locking female component buckle 22 with male component buckle 20. Similarly, belt 28 fastens to the child's waist by locking female component buckle 32 with male component buckle 30. Other fastener mechanisms and buckles known in the art can be used to fasten belts 18 and 28 to the wearers, including those which provide safety features to prevent a child from removing belt 28 without the caretaker's permission.

Retractable mechanism 14 allows the caretaker and child to vary their distance from each other without tangling tether 24. Retractable mechanism 14 is preferably small so that it is not obtrusive, and durable to withstand the weight of a child. Retractable mechanism 14 shown in the preferred embodiment is the POWER LEASH™ JR., sold as a dog leash by Power Leash USA Inc., however any retractable mechanism can be used provided its tether can be attached securely to belt 28, its casing can be attached securely to belt 18, and the retractable mechanism can withstand the weight of a small child.

An attractive decorative toy 10 hides tether attachment ring 26 as well as part of belt 28, and decorative toy 12 hides retractable mechanism 14, as well as bracket 16 and part of belt 18. In the preferred embodiment, attractive decorative toys 10 and 12 are two frogs, with their "tongues" attached together by tether 24.

In the preferred embodiment, a fanny pack zipper 34 opens and closes a fanny pack 36 which can be used by the child to store small objects. It would be obvious to one skilled in the art that other closure methods can be used to close fanny pack 36, such as VELCRO® fastener, snaps, or ties. Belt 28 is threaded between decorative toy 10 and the fanny pack 36 so as not to interfere with the hollow compartment of fanny pack 36.

Figure 2:
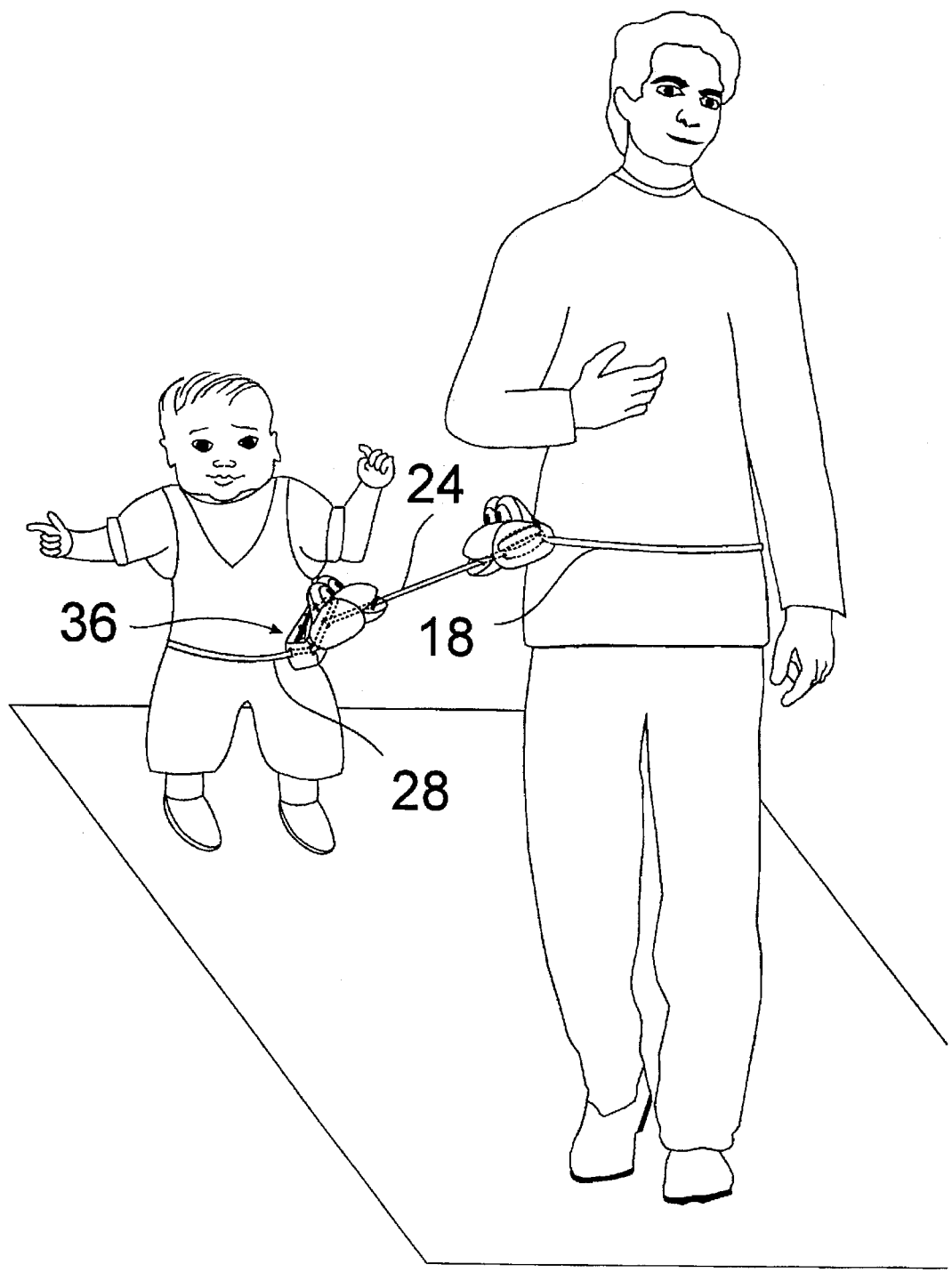
FIG. 2 shows the preferred embodiment of the combination toy and child safety line as utilized by a caretaker and child.

FIG. 2 shows the preferred embodiment utilized by a caretaker and child. Belt 28 is fastened around the child and belt 18 is fastened around the caretaker. Tether 24 is slightly retracted and can extend further as the child moves away from the caretaker. Fanny pack 36 is used by the child to store small objects.

Figure 3:
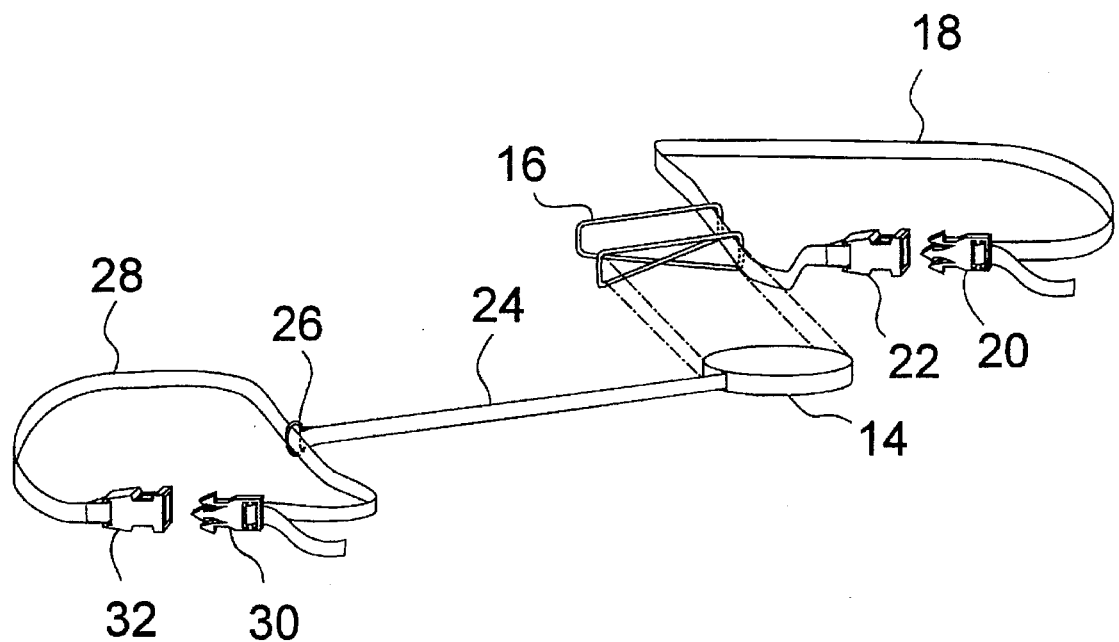
FIG. 3 shows a side perspective of the preferred embodiment of the combination toy and child safety line in expanded view without the decorative toys.

FIG. 3 shows a side perspective of the preferred embodiment of the combination toy and child safety line in expanded view without decorative toys 10 and 12. Retractable mechanism 14 is attached to belt 18 by bracket 16. Tether 24 is attached to belt 28 by tether attachment ring 26.

Figure 4:
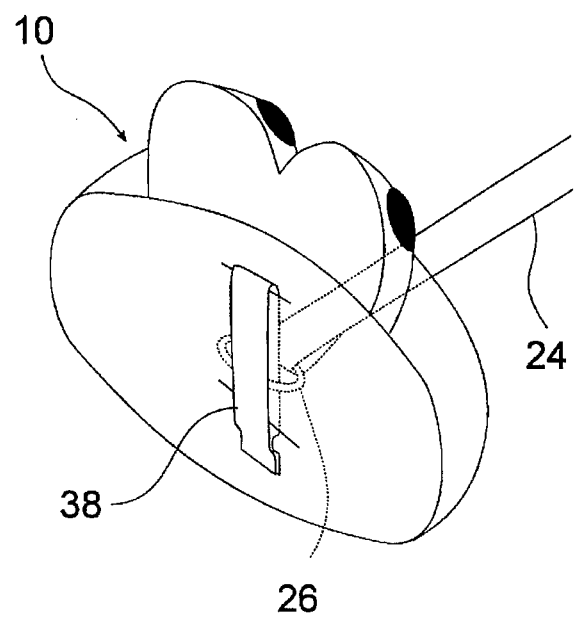
FIG. 4 shows a clip attachment instead of a belt attachment.

FIG. 4 shows a clip attachment for connection to the caretaker or child. Clip 38 is connected to tether 24 by tether attachment ring 26. Clip 38 connects to the wearer's belt, belt loop, or other article of clothing. Clip 38 can also connect to a baby stroller, shopping cart or other inanimate object. The use of clip 38 instead of belt 18 or belt 28 in the preferred embodiment as an attachment method allows the combination toy and child safety line to be used with multiple children. For example, using clip 38, a caretaker can clip two combination toy and child safety lines onto belt loops of a child—the first combination toy and child safety line can be tethered to the caretaker, while the second combination toy and child safety line can be tethered to a second child. As another example, with clip 38, a caretaker could clip three separate combination toy and child safety lines onto herself, and a fourth onto a baby stroller, which could in turn be attached to four separate children. It would be obvious to one skilled in the art, that types of clips other than that shown in FIG. 4 would be appropriate to attach the combination toy and child safety line to a child or caretaker so that the clip can be easily removed. Alternately, it would be obvious to one skilled in the art that types of clips other than that shown in FIG. 4 would be appropriate to attach the combination toy and child safety line to a child or caretaker so that the clip cannot be easily removed.

Figure 5:
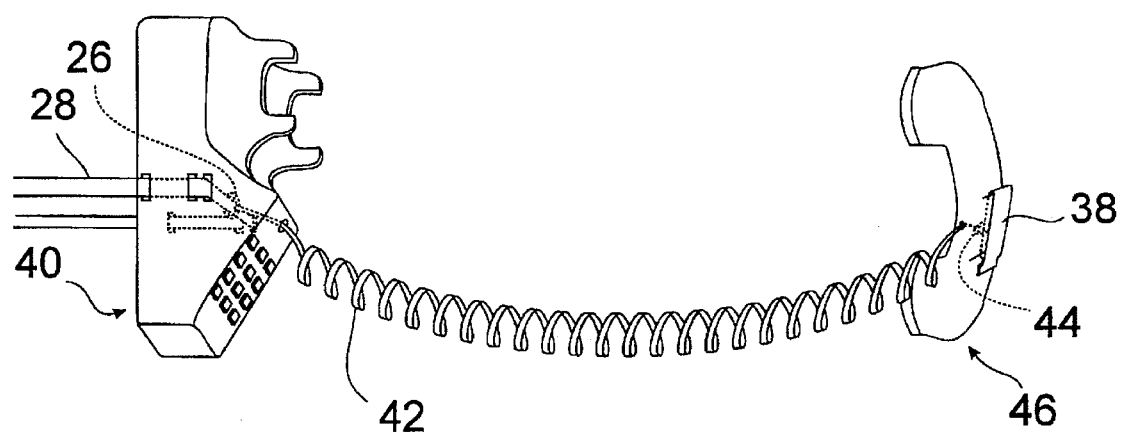
FIG. 5 shows another embodiment of the combination toy and child safety line without a retractable tether mechanism, with both a clip attachment and a belt attachment, and a different decorative toy which resembles a telephone.

FIG. 5 shows another embodiment of the combination toy and child safety line without a retractable tether mechanism, with both a clip attachment and a belt attachment, and a different decorative toy which resembles a telephone. Tether 42 is attached to belt 28 by attachment ring 26. Tether 42 is attached directly to clip 38 by clip attachment ring 44. In this embodiment, tether 42 is formed into a coil allowing it to retract as the caretaker and child move closer together so that it does not tangle. Tether 42 is preferably made of an elastic semi-rigid material such as plastic or plastic coated wire so that when coiled, it retracts similar to an actual telephone cord. Decorative toy 40 resembles a telephone, and decorative toy 46 resembles a telephone receiver.

CONCLUSION, RAMIFICATIONS, AND SCOPE OF INVENTION

Decorative toys and tether design shown in FIG. 1 and FIG. 5 allow the combination toy and child safety line to be used as an entertaining toy. In FIG. 1, the two frogs appear to be kissing when retracted fully, and their tongues remain attached when the frogs are pulled apart from each other. Similarly, the embodiment of the combination toy and child safety line in FIG. 5 can be used as a toy telephone. The embodiments shown should not be construed as limiting the scope of the invention, but as merely providing illustrations of some of the preferred embodiments of the invention. In a similar embodiment within the scope of this invention, the phone might "ring" or the buttons might make sounds. In other embodiments within the scope of this invention, the child and caretaker decorative toys could include, but not be limited to the following:

two animals such as a monkey attached to another monkey by its tail, a bird attached to another bird by a worm, a frog attached to a fly by its tongue, or a cat attached to a mouse by its arm;

two separate parts of a single body, such as a giraffe body attached to its head by a neck;

two people, such as a child and a mother attached by a miniature child/mother safety line, or two little girls attached by a jump rope;

two inanimate objects such as a train attached to another train by a train track; or a belt and an associated object such as a repairman's belt attached to a hammer by a tape measure, or a policeman's belt attached to handcuffs by a chain.

In still other embodiments within the scope of this invention, the decorative toys could include but not be limited to:

methods to create sounds, such as when the tether retracts, or when the decorative toy is squeezed;

methods to play music;

objects to twirl, slide or squeeze;

different textures to feel; or lights that flash or glow.

In still other embodiments within the scope of this invention:

clip 38 could slide along a track or belt worn by the child or caretaker to provide further range of motion;

tether attachment ring 26 or belt 28 could be made of an elastic material to provide shock absorption when the end of the tether line is reached;

retractable mechanism 14 could possess a safety lock mechanism to fix the length of tether 24 at a predetermined length;

fanny pack 36 could have separate compartments with different storage capabilities such as compartments that are waterproofed or disposable;

belt 28 or clip 38 could activate an alarm if detached unexpectedly from the child;

fanny pack 36 could be detachable from tether 24 so that it could be used alone; or decorative toys 10 and 12 could be made of reflective material to provide safety when used in the dark.

The embodiments mentioned and shown in the figures should not be construed as limiting the scope of the invention, but as merely providing illustrations of some of the preferred embodiments of the invention. Other and future modifications, apart from those shown or suggested herein, may be made within the spirit and scope of this invention, thus the scope of the invention should be determined by the appended claims and their legal equivalents, rather than by the examples given.

Accordingly, because it is both a toy and a child safety line, the combination toy and child safety line is socially acceptable and offers an important utility to caretakers who desire to control the range of motion of their children, but who want both the child and society to accept the method of constraint. The combination toy and child safety line also provides additional advantages:

the ability to store small objects the ability to limit the range of motion of a child without constraining the hands or arms of either the caretaker or child the ability to use simultaneously with multiple children the ability to avoid tangling the ability to provide a great range of freedom of motion while maintaining constraint.

What is claimed is:

1. A combination toy and child safety line for constricting the range of motion of a child comprising in combination:

a) a tether having two ends with said tether being of sufficient strength to bear the weight of a small child, and b) a first attachment means for affixing first end of said tether to a caretaker, and c) a second attachment means for affixing second end of said tether to a child, and d) a first entertainment device positioned at a first point of contact of said first end of tether with said first attachment means, said first entertainment device being integrated with said first end of tether and said first attachment means at said first point of contact, whereby said first entertainment device appears to be worn by the individual to whom it is attached, and e) said first entertainment device being substantially large to cover said first end of said tether and a large potion of said first attachment means at said first point of contact, and f) a second entertainment device positioned at a second point of contact of said second end of tether with said second attachment means, said second entertainment device being integrated with said second end of tether and said second attachment means at said second point of contact, whereby said second entertainment device appears to be worn by the individual to whom it is attached, and g) said second entertainment device being substantially large to cover said second end of said tether and a large potion of said second attachment means at said second point of contact, h) wherein at least one of said first or second attachment means comprises an elongated belt and respective said first or second entertainment device covering a large portion of said belt at a respective first or second point of contact.

2. The combination toy and child safety line of claim 1 wherein said tether includes a recoiling means for allowing said tether to vary its length.

3. The combination toy and child safety line of claim 2 wherein said recoiling means is a retractable mechanism.

4. The combination toy and child safety line of claim 2 wherein said recoiling means is a coil.

5. The combination toy and child safety line of claim 1 wherein one of said first or second attachment means is a clip.

6. The combination toy and child safety line of claim 1 further including a storage means as part of said first entertainment device for carrying small objects, said storage means having a closure element.

* * * * *